UNITED STATES PATENT OFFICE.

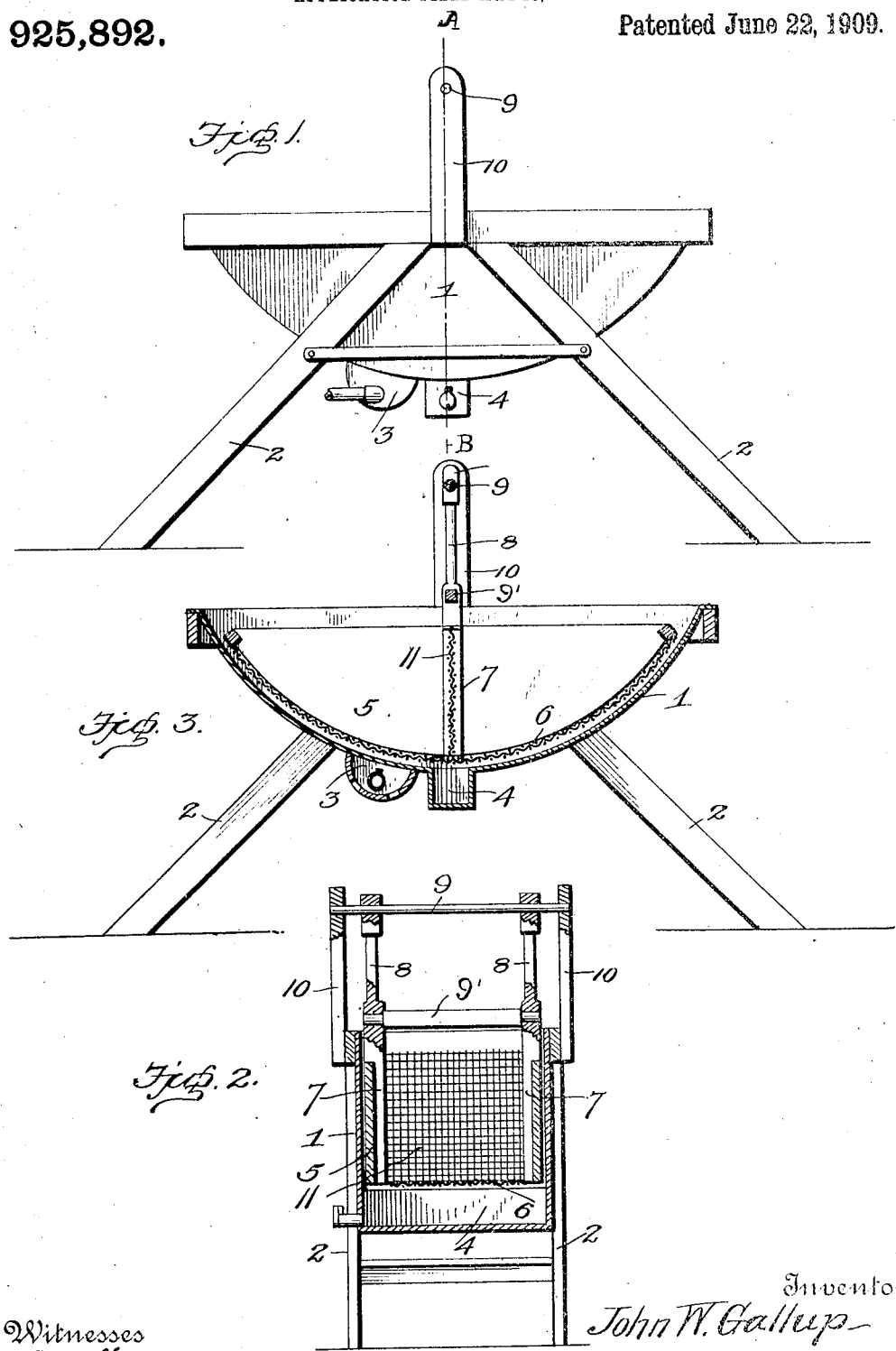

JOHN W. GALLUP, OF BELLEVUE, OHIO.

DISH-WASHER.

No. 925,892.　　　　Specification of Letters Patent.　　　Patented June 22, 1909.

Application filed May 28, 1908. Serial No. 435,450.

*To all whom it may concern:*

Be it known that I, JOHN W. GALLUP, a citizen of the United States, residing at Bellevue, in the county of Huron and State of Ohio, have invented certain new and useful Improvements in Dish-Washers; and I do declare the following to be a full, clear, and exact description of the invention, such as will enable others skilled in the art to which it appertains to make and use the same.

My invention relates to improvements in dish washers.

It has for its object to provide for the ready and effective cleansing of dishes or other objects which it may be desired to cleanse, also to carry out these ends in a simple and economical manner.

With these and other objects in view, the invention consists of certain novel features of construction, combination and arrangement of parts, as will be more fully described and particularly pointed out in the appended claim.

In the accompanying drawings illustrating the preferred embodiment of my invention, Figure 1 is a side elevation thereof, and Fig. 2 is a sectional view of the same taken on the line *a—b* of Fig. 1, some parts being shown in elevation. Fig. 3 is a vertical longitudinal section thereof.

In practicing my invention I employ a suitable receptacle 1 which may be of the outline disclosed by Fig. 1, or other suitable shape and suitably mounted in place upon legs or supports 2, secured laterally to said receptacle in a preferably diagonal position. Said receptacle has applied to its bottom, near the center thereof a heater 3, preferably of the contour disclosed also by Fig. 1 and adapted to be heated by gas or gasolene to deliver its heating action to the water placed in the receptacle 1 for cleansing purposes. Also applied or secured to the bottom of the receptacle 1, about the center thereof, is a trough or chamber 4 for collecting sediment or drainage from said receptacle, said chamber having a suitable outlet for the passing off of its contents. Said receptacle is preferably made of galvanized iron, or other metal.

Arranged within the receptacle 1 is an inner receptacle 5 with its bottom member of the same general outline as the corresponding member of said receptacle, and having preferably wooden sides, said bottom member being formed of wire work, centrally of which are secured lateral upright members or arms 7 having integral extensions 8, with a rock shaft or bar 9 suitably journaled in upright fixed members or bars 10 of the receptacle 1. Also secured to the bottom member 6 of the receptacle 5 is an upright woven wire partition 11, vertically subdividing the latter receptacle in two compartments which receive the dishes or objects for cleansing, by means of which partition dishes may be piled edgewise upon each other from the center toward the ends of said compartments, as will be readily understood. Journaled in the side members 7, and bridged therebetween is a rocking handle or rung 9', which is arranged between the screen partition, and the shaft 9. After said dishes have thus been cleansed the receptacle 5 is swung so as to remove its contents out of the water in the receptacle 1, which will thus permit the surplus water to be drained from the dishes as in drying the same, after which the dishes may be removed and the aforesaid operation repeated, other dishes or objects having been placed in the receptacle 5, and the water in the receptacle 1 being heated for that purpose, if not at the time having the requisite temperature.

By constructing the two bottoms of the receptacles semi-cylindrical and spacing the same apart a slight distance, a water space is formed between the bottoms of said receptacles so as to permit of the water therein being forced through the bottom of the reticulated receptacle and upwardly against the dishes, this operation is accomplished by the rocking motion of the inner receptacle within the outer receptacle.

Having thus described my invention, what I claim and desire to secure by Letters Patent is:—

A washing machine comprising an outer and inner semi-cylindrical receptacle, the inner one of said receptacles having a foraminous bottom and imperforate sides, bearing uprights extending vertically from the central portions of the sides of the outer receptacle, a shaft forming the center of the circle of which the outer and inner vessels are formed, said shafts being journaled in the upper ends of the uprights, upright members secured to the sides of the inner receptacle and extending up into pivotal connection with said shaft, a vertical foraminous partition bridged between and secured to the upright members within the inner receptacle, and a manipulating handle journaled in the upright members between the shaft and said partition for reciprocating the inner vessel.

In testimony whereof I have hereunto set my hand in presence of two subscribing witnesses.

JOHN W. GALLUP.

Witnesses:
J. P. VICKERY,
R. N. LEONARD.